No. 715,306. Patented Dec. 9, 1902.
W. S. SHARPNECK.
GRAIN ELEVATOR AND TRANSMITTER.
(Application filed July 11, 1901. Renewed May 8, 1902.)
(No Model.)
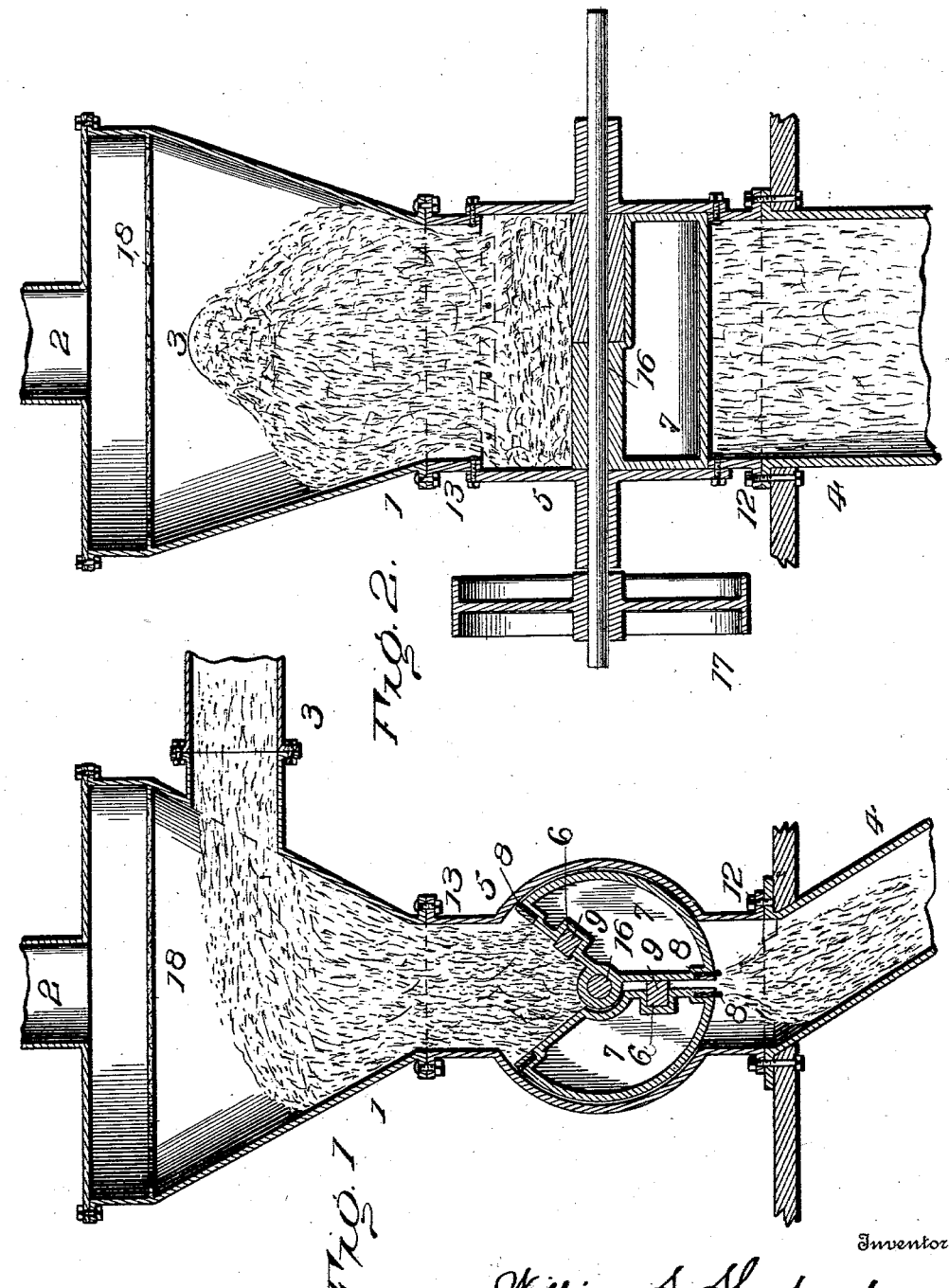

UNITED STATES PATENT OFFICE.

WILLIAM S. SHARPNECK, OF CHICAGO, ILLINOIS, ASSIGNOR OF SEVEN-NINTHS TO ORTON G. ORR AND FRANK A. SHARPNECK, OF CHICAGO, ILLINOIS.

GRAIN ELEVATOR AND TRANSMITTER.

SPECIFICATION forming part of Letters Patent No. 715,306, dated December 9, 1902.

Application filed July 11, 1901. Renewed May 8, 1902. Serial No. 106,493. (No model.)

*To all whom it may concern:*

Be it known that I, WILLIAM S. SHARPNECK, a citizen of the United States, residing at Chicago, in the county of Cook, State of Illinois, have invented a certain new and useful Improvement in Grain Elevators and Transmitters, of which the following is a specification, reference being had to the accompanying drawings.

This invention relates to an improvement in apparatus for transferring or elevating grain, &c., and more particularly to that portion of such apparatus where the grain is taken from the "vacuum-tank."

The present invention has for its object, among others, to provide a simple and cheap form of apparatus whereby the grain may be taken from the vacuum-tank without spoiling or diminishing the vacuum to any appreciable extent.

A further object is to provide a novel form of revolving gates or valves which serve to maintain the vacuum, one of the valves being mounted to gravitate to close the opening between itself and its companion valve or gate, and thereby form an opening at the top for the reception of another lot of the grain or other material.

Other objects and advantages of the invention will hereinafter appear, and the novel features thereof will be particularly pointed out in the appended claims.

The invention in its preferred form is clearly illustrated in the accompanying drawings, which, with the numerals of reference marked thereon, form a part of this specification, and in which—

Figure 1 is a substantially central transverse vertical section of my apparatus, and Fig. 2 is a substantially central vertical section taken at right angles to Fig. 1.

Referring now to the details of the drawings by numerals, 1 represents a tank, to which is connected a pipe 2, leading to an exhaust-fan or other means (not shown) for creating or tending to create a vacuum in the tank 1.

3 indicates a pipe supplying the grain being transferred, the pipe connecting with the tank 1.

The discharge-exit is shown at 4 4 and is connected to the tank 1 by means of the intermediate casing 5, which latter is bolted to the discharge-pipe at 12 and to the tank at 13, as clearly shown in the drawings. The central portion of this casing 5 is of cylindrical form, as shown in Fig. 1, and within the said cylindrical portion are situated the rotary valves or gates 7, one of which is rigidly connected with the shaft 16 and the other loosely connected therewith for the purpose to be hereinafter described. This shaft 16 is driven by the pulley 17 from any convenient source of power. From an inspection of Fig. 1 it will be seen that these valves or gates 7 are of peculiar form and have rubber or other packing 8 secured at their edges to keep them tight within the cylindrical part of the casing 5. Bumpers 9, of rubber or other suitable material, are inserted within recesses 6 in these valves or gates, which cushion the blow of the valves or gates when they strike together.

Near the top of the tank 1 is a screen-covering 18, (shown in dotted lines,) which prevents the wheat or light grain from being carried up into the pipe 2 and from there to the blower or vacuum-fan.

During the operation of the device the grain is drawn through the pipe 3 into the tank 1 and drops by gravity into the opening left between the two revolving valves or gates 7, and as the valves or gates rotate the grain is carried to the lower side and that one of the valves or gates which is loosely supported drops by gravity as the grain descends into the exit 4 4 and closes the opening at the bottom, simultaneously forming another opening at the top, into which the grain drops, as before.

From the above and the accompanying drawings it will be seen that I have invented an apparatus for taking grain out of a vacuum-tank without spoiling or diminishing the vacuum to any appreciable extent, for the reason that as the valves or gates rotate the packing 8 prevents the air from escaping between the valves or gates and the inside wall of the cylindrical part of the casing; but while the structural embodiment of my invention as hereinbefore described is what I at the present time consider preferable it is evident that variations, modifications, and changes may be made without departing from the spirit of the invention or sacrificing any of its advantages, and I therefore do not restrict myself to the structural embodiment herein described, but reserve the right to make such variations, modifications, and changes as properly come within the scope of the protection prayed.

What I claim as new is—

1. In a grain-transferring apparatus, a vacuum-tank and revoluble valves, one of which is movable with relation to the other, as set forth.

2. In a grain-transferring apparatus, a pair of rotatable valves, one of which is a gravitating valve and a rotatable shaft for rotating said valves, as set forth.

3. In a grain-transferring apparatus, the combination of a vacuum-tank, a revoluble shaft and a valve carried thereby, and an operating-valve loosely mounted about said shaft, as set forth.

4. In a grain-transferring apparatus, the combination with a vacuum-tank, of rotatable valves controlling the outlet therefrom, and a rotatable shaft for rotating said valves and means coöperating with said valves for maintaining the vacuum, as set forth.

5. In a grain-transferring apparatus, the combination with a vacuum-tank and a casing interposed between the same and the discharge-orifice, of rotatable valves in said casing, one of which is movable with relation to the other, and a rotatable shaft for rotating said valves, as set forth.

6. In a grain-transferring apparatus, the combination with a vacuum-tank and the casing interposed between the same and the discharge-orifice, of a revoluble shaft extended through said casing, a valve movable with the shaft, and a coöperating valve movable independently of the first-mentioned valve, as set forth.

7. In a grain-transferring apparatus, the combination with a vacuum-tank and the casing interposed between the same and the discharge-orifice, of a revoluble shaft extended through said casing, a valve movable with the shaft, and a coöperating valve movable independently of the first-mentioned valve, and means for maintaining the vacuum within said tank, as set forth.

8. In a grain-transferring apparatus, the combination with a vacuum-tank and the casing interposed between the same and the discharge-orifice, of a revoluble shaft extended through said casing, a valve movable with the shaft, a coöperating valve movable independently of the first-mentioned valve, and means carried by said valves for preventing the spoiling or diminishing of the vacuum, as set forth.

9. In a grain-transferring apparatus, the combination of two valves both rotatable, and one rotatable independent of the other for a portion of its travel, and a rotatable shaft for rotating said valves, as set forth.

10. In a grain-transferring apparatus, a pair of rotatable valves, one movable with relation to the other and means for cushioning the blow of said valves, when they come together, as set forth.

11. In a grain-transferring apparatus, the combination with the vacuum-tank and casing connected therewith, of rotatable valves in said casing provided at their peripheries with packing devices, and upon their adjacent portions with cushioning devices, as set forth.

In testimony whereof I affix my signature, in the presence of two witnesses, this 28th day of June, 1901.

WILLIAM S. SHARPNECK.

Witnesses:
RACHEL ELIASSOF,
ANNIE M. ADAMS.